United States Patent [19]

Krippner et al.

[11] Patent Number: 4,562,735

[45] Date of Patent: Jan. 7, 1986

[54] INSTALLATION FOR MONITORING PARAMETERS OF AN OBJECT

[76] Inventors: Gunther Krippner, Kuhreiterweg 23, A-4040 Linz; Karl Kletzmaier, Durnberg 63, A-4100 Ottensheim, both of Austria

[21] Appl. No.: 538,103

[22] Filed: Oct. 3, 1983

[30] Foreign Application Priority Data

Oct. 8, 1982 [AT] Austria ................................. 3727/82

[51] Int. Cl.$^4$ .......................... G01B 7/04; G01B 5/10; G01B 11/10
[52] U.S. Cl. ............................... 73/432 R; 33/178 E; 33/552; 250/223 R
[58] Field of Search ............. 33/174 P, 178 R, 178 E; 250/223 R; 73/432 R, 432 G

[56] References Cited

U.S. PATENT DOCUMENTS

| 3,149,519 | 9/1964 | Anderson | 33/178 R |
| 3,485,339 | 12/1969 | Miller et al. | 250/223 R |
| 3,552,190 | 1/1971 | Lefebvre | 73/622 |
| 3,819,918 | 6/1974 | Hale | 250/223 R |
| 3,945,125 | 3/1976 | Mouat | 33/174 P |

Primary Examiner—S. Clement Swisher

[57] ABSTRACT

An apparatus for determining the size of elongated objects, specifically logs. The logs (4) are floated in a water filled canal (5) and advanced past a measuring device 13 by cranes 8 or water jets. The size of the logs is determined by radiation sensitive devices (21) actuated by light sources 22 or mechanical transducers (54, 55, 56, 57). In another embodiment the log is held stationary while the measuring device is moved longitudinally past the log.

7 Claims, 3 Drawing Figures

U.S. Patent   Jan. 7, 1986   4,562,735
Fig.1
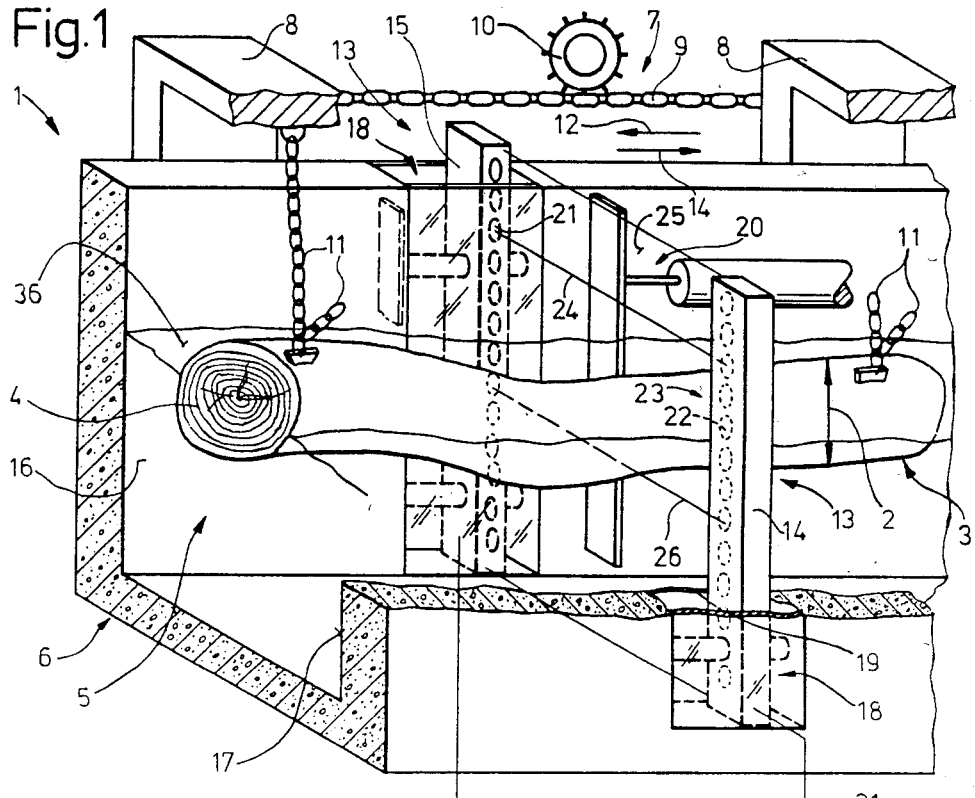
Fig.2
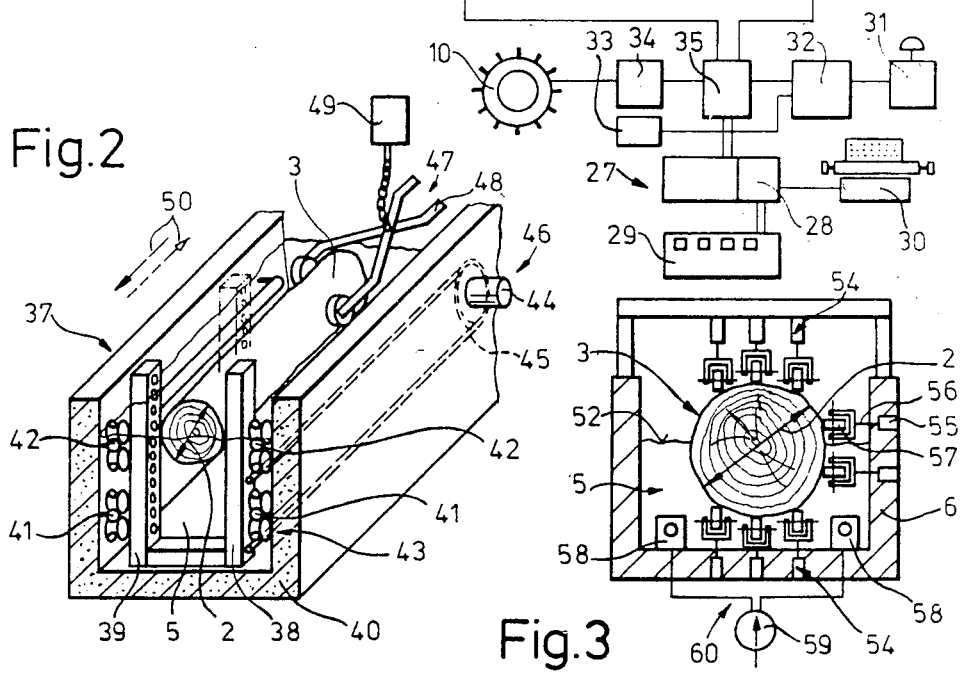
Fig.3

INSTALLATION FOR MONITORING PARAMETERS OF AN OBJECT

The invention relates to an installation for determining or monitoring the physical size of an object, especially the diameter or volume of wooden trunks, which comprises a conveyor for the object, a measuring device therefor, as well as a processing unit associated with the measuring device.

In a known device for determining or monitoring the parameters of an object—Published German Patent Application No. 2,556,975—, a photoelectric measuring device has a sensing device with a plurality of radiation-sensitive elements arranged on a measuring plane, and a source of radiation is associated therewith on the measuring plane to produce a shadow image of the object. To obtain an accurate measuring result independently of the distance or position of the wooden trunk relative to the measuring plane or the source of radiation, a device for determining the distance between the measuring plane and the object is arranged in a plane extending perpendicularly to the measuring plane or at a pre-adjustable distance from the measuring plane. In this manner, changes in the distance between the object to be measured and the measuring plane or the source of radiation associated therewith can be taken into account and extremely accurate measuring results may be obtained. This measuring device has been commercially successful but it has been found that the measuring accuracy was not good engough in some instances.

The present invention has the object of providing an installation for determining or monitoring the physical size of an object of the first-described type, which operates very accurately, enables the physical size of the object to be sensed quickly and assures the reception of the natural parameters of the object.

This object of the invention is accomplished by constituting the conveyor for the transportation of the object in and/or as a water bath and moving the measuring device actuated by a switching member for determining the physical size the object in the water bath or carried by the water, the measuring plane defined by the measuring value receivers of the measuring device being aligned substantially perpendicularly to the surface of the water. The advantage of the invention resides in the object being carried by the water while the parameter is determined and the correct diameter values as well as the natural contour of an object to be measured, particularly of a wooden trunk, are fixed. The solution according to the invention enables measuring errors, which occur in most measuring devices because of deformations of the objects due to their own weight, to be avoided or eliminated in a surprisingly simple manner, and thus to determine the contour in a manner being as little as posible influenced by gravity. Because of the exact determination of the natural contour of the object, particularly a wooden trunk, a cutting plane optimally adapted thereto may be worked out, which guarantees a minimum of wasted timber. Ths enhances not only the economy of the measuring device but also of the subsequent operations, such as cutting or the like.

According to another feature of the invention, the measuring device comprises fixedly arranged measuring value receivers and the conveyor comprises a longitudinal advance drive wherewith the object may be moved perpendicularly to the measuring plane. Since the object is guided by the water bath in a vertical direction, it is simple to move it past the measuring deviced by using the water bath, it being possible to maintain a desired lateral distance of the center longitudinal axis of the object from the measuring value receiver so that no additional distancing devices between the object and the measuring value receiver are needed.

According to another very substantial feature of the invention, the conveyor comprises two devices for seizing the object, particularly grippers, spaced in the longitudinal direction and coupled to the longitudinal advance drive, and applies a force corresponding to the gripper weight to the longitudinal advance drive and, optionally, a lifting drive simultaneously with actuating the measuring device by means of the switching member. The two grippers enable the object to be guided parallel in the water bath, any disadvantages or falsifications in the measuring results due to the weight of the gripper device being equalized or avoided by a suitable structuring of the grippers with buoyant bodies or by actuating the lifting drives.

The conveyor may also be provided with a longitudinal positioning means according to the invention and some measuring value receivers may be arranged below the water surface, particularly within the water bath, while some are arranged above the water surface and are connected to a longitudinal advance drive, whereby a measuring value reception may be obtained in exactly defined longitudinal zones of an object, as is required, for example, in calculating the volume of wooden trunks. The arrangement of measuring value receivers above and below the water surface makes a fault-free determination of the measuring value possible even if the entire object is not immersed in the water.

A further feature of the invention provides that the water bath is formed by a canal or trough in whose lateral walls transparent windows are arranged at least in the range of the measuring value receivers. This makes it possible to arrange the measuring device in the dry, thereby simplifying the maintenance and additionally increasing the service life of the device.

It is, furthermore, advantageous according to the invention if the longitudinal advance drive of the conveyor is constituted by a preferably adjustable water current, for example flow nozzles with a high-pressure pump. In this manner, the medium taking over the vertical guidance of the object in the range of the measuring device also effects the advancing movement at the same time, and mechanical devices may be saved. Such an installation is advantageous primarily in measuring wooden trunks or wooden structural parts when they are delivered by streams of water or are stored in troughs.

It is within the scope of the invention to constitute the measuring device by a source of radiation and radiation-sensitive elements cooperating therewith, the object being movable between the source of radiation and the elements. This embodiment is distinguished by the addition of the advantages of the device according to the invention with the advantages of the high measuring accuracy obtained by such measuring value receivers cooperating with sources of radiation.

In an advantageous embodiment, the measuring device has mechanical measuring value receivers, particularly electromechanical transducers, and the transducers are arranged within and outside the water in the range of the circumference of the object to be measured and these transducers preferably have sensing arms preferably provided at their ends with rolling or gliding elements. This measuring device has the advantage that parts of bark or split pieces of wood, sawdust or the like floating in the water bath cannot disadvantageously influence the measuring result.

It is also possible according to the invention that the measuring device comprises a source of radiation constituted by a laser beam. This embodiment is distinguished by the high coherence of the laser beam radiation, which makes a very exact measuring value determination possible even if the water is turbid.

Finally, it is also advantageous within the scope of the invention if a cleaning device is associated with the measuring device or the side walls, preferably in the range of the windows, and a separating device for floating bodies, particularly bark, is preferably associated with the water bath since this will keep the area in which the measuring value receivers are arranged free of deposits and dirt so that different brightness conditions cannot falsify the measuring result.

For a better understanding of the invention, the embodiments illustrated in the drawing will be described in detail hereinafter.

There is shown in

FIG. 1 an installation for determining or monitoring the physical size of an object, in a perspective view;

FIG. 2 another embodiment of an installation according to the invention with a movable measuring device, in a perspective view;

FIG. 3 an end view of an installation according to the invention with mechanical measuring value receivers.

FIG. 1 illustrates installation 1 for determining or monitoring dimensions 2 of object 3, for example the diameter, of wooden trunk 4. Conveyor 7 is arranged for advancing wooden trunk 4 within water bath 5 arranged, for example, in canal 6 defined by masonry walls. This comprises two gantry cranes 8 which are advanced in the longitudinal direction of canal 6 by means of drive chain 9 operated by a central drive motor of longitudinal advance drive 10. Wooden trunk 4 is suspended from the two gantry cranes 8 by chains 11 and is moved past measuring device 13 during the measuring stage, as indicated by arrow 12. The two gantry cranes 8 are rapidly returned by longitudinal advance drive 10 to their starting position after wooden trunk 4 has been moved past measuring device 13 to enable the next wooden trunk 4 to be moved past measuring device 13. Chains 11 and gantry cranes 8 impart to wooden trunk 4 only a forward movement in the direction of arrow 12 and the weight or mass of wooden trunk 4 is absorbed by water bath 5, that is, object 3 is carried by the water. This causes wooden trunk 4 to assume a position corresponding to its natural contour during the measuring stage and not to be deformed by gravity. For a better understanding of the essence of the present invention, wooden trunk 4 has been illustrated with an exaggerated bend along its longitudinal extension.

Windows 18 with glass-clear transparent or translucent panes are arranged in wide walls 16, 17 of canal 6 in the range of measuring value receivers 14, 15. Windows 18 are constituted by two spaced glass panes 19 mounted in side walls 16, 17. Measuring value receivers 14 and 15 are arranged between the two glass panes 19.

Cleaning device 20 is associated with these windows 18 to assure that glass panes 19 are not dirtied on the inside of water bath 5 by deposits and to make a fault-free reception of the measuring values possible, which may be guided by a cylinder-piston means in the direction of arrow 12 over glass pane 19 in the manner of a windshield wiper. A like arrangement is also associated with measuring value receiver 14.

Measuring device 13 consists of two measuring beams. A multiplicity of radiation-sensitive elements 21 are arranged closely adjacent in a single row in the measuring beam of measuring value receiver 14. Light emitter 22 constituting source of radiation 23 as associated with these radiation-sensitive elements 21, for example semi-conductive light receivers, in the oppositely disposed measuring beam of measuring value receiver 15. A respective light emitter 22 and radiation-sensitive element 21 are disposed accurately opposite each other, as indicated by beam 24.

Dimension 2, namely the diameter of the wooden trunk, can be determined as wooden trunk 4 is moved by conveyor 7 through measuring plane 25 defined between the two measuring value receivers 14, 15. The number of radiation-sensitive elements 21 covered by wooden trunk 4 is equivalent to dimension 2, which is the diameter of wooden trunk 4 in the present case. This is so because, as indicated by way of example by beam 26, wooden trunk 4 interrupts the path between a light emitter 22 and the opposite receiver 21 so that beam 26 is interrupted. By the fixed arrangement of measuring value receivers 14, 15 relative to the water surface in water bath 5 and floating wooden trunk 4, it is possible during the forward movement and the different covering of radiation-sensitive elements 21 to make visible not only dimension 2 but also the outer contour of the longitudinal extension of wooden trunk 4 on indicating panel 29 or recording devce 30 by means of processing unit 28 connected to control device 27. This is of particular importance if blocks of wood are to be cut out of wooden trunk 4 since wooden pieces with sharp edges can be cut out only in that range of the volume of the wooden trunk where there are not deformations or bends or the like over the entire length of the trunk. In this manner, it is advantageously possible in connection with the arrangement of the invention to obtain an optimal cutting program for cutting wooden trunks 4 on the basis of the natural contour. Control device 27 additionally comprises switching member 31 for initiating a measuring stage and which simultaneously energizes the control device for actuating measuring device 13 by means of actuating member 32 and control module 33 for actuating longitudinal advance drive 10. The length of trunk 4 as well as the measuring value determination in different longitudinal zones of wooden trunk 4 may be controlled by measuring device 13 by connecting advance movement signaling device 34 which is actuated in dependence on starting signal emitter 35. Starting signal emitter 35 energizes advance movement signaling device 34 when wooden trunk 4 covers the first radiation-sensitive element 21 and interrupts the signal transmission of advance movement signaling device 33 to control device 27 when none of the radiation-sensitive elements is any longer covered by wooden trunk 4.

As is clearly shown in FIG. 1, light emitters 22 as well as radiation-sensitive elements 21 are positioned above as well as below water surface 36 of water bath 5, measuring plane 25 extending substantially perpendicularly to water surface 26.

A modified embodiment of an installation 37 for determining or monitoring parameters 2 of object 3 in water bath 5 is shown in FIG. 2.

Measuring value receivers 38, 39 are disposed within canal 40 in this installation 37 and are movable along canal 40 by roller arrangements and, for example, cable 45 of longitudinal advancement device 46 driven by a longitudinal advance drive on a longitudinal guide track constituted by guide colums 41, 42. Devices 47, for example gripper 48 at both ends of object 3, are provided to retain object 3 during the measuring stage. To avoid a change in the contour or longitudinal profile of object 3 by the weight of grippers 48, they may be connected to lifting drive 49 which may, for example, be so actuated by control device 27 that it subjects gripper 48 to a lifting force corresponding to the weight of gripper 48.

The control of the measuring stage and the processing of the resultant measuring signals may proceed according to the explanations of the control arrangement in FIG. 1, longitudinal advance drive 44 for measuring value receivers 38, 39 being actuated instead of longitudinal advance drive 10. As indicated by arrows 50, measuring value receivers 38, 39 may be moved in water bath 5 at a lower velocity when they receive the measuring values than when they are returned into their starting position for proceeding to the subsequent measuring stage. Under certain conditions, it is not necessary to return the measuring device to its starting position at the end of a measuring stage but the subsequent object may be measured immediately in a countercurrent movement.

FIG. 3 illustrates another installation 51 for determining parameter 2 of object 3 in water bath 5. Water bath 5 is again contained in canal 6. Measuring device 53 with a plurality of mechanical measuring value receivers 54 arranged within and outside water bath 5 in the range of the circumference of object 3 to be measured is provided in a cross sectional zone of canal 6, which is identical to measuring plane 25 according to FIG. 1 and extends substantially perpendicularly to water surface 52. Each measuring value receiver 54 consists of electromechanical transducer 55, for example an immersion potentiometer or a rotary field transmitter or the like as well as sensing arm 56 on whose end facing object 3 rolling elements 57 is arranged. By suitably adjusting rolling elements 57 when object 3 passes by—either by changing the distance of rolling elements 57 from the walls of the canal or by pivoting sensing arms 56 relative to their electromechanical transducers—, dimension 2 as well as the contour or the longitudinal profile of object 3 may be determined while it is carried by the water and without being influenced by gravity.

The advancement of object 3 may be effected in the present embodiment by a current produced in the water, for which purpose flow nozzles 58 coupled to high-pressure pump 59 are arranged in canal 6. A current extending in the direction of elongation of canal 6 is imparted to water bath 5 by means of high-pressure pump 59 so that object 3, for example wooden trunk 4, is moved forward in the direction of elongation of the canal at a uniform speed. Flow nozzles 58 and high-pressure pump 59 constitute longitudinal advance drive 60.

The structure of the measuring device used in connection with the installation according to the invention may be changed suitably within the scope of the invention; any other measuring devices, such as electric eyes, ultrasound arrangements or sources of radiation with light emitters constituted by a point-shaped light source or, for example, also a laser, may be used instead of the described light emitters and radiation-sensitive elements or mechanical measuring value receivers.

The construction of the measuring device or of the associated processing unit may advantageously be according to our Austrian Pat. No. 351,282 or Austrian Pat. No. (A 5659/81).

We claim:

1. Installation for determining or monitoring the physical size of sequential sections of an elongated object, which comprises
   (a) a device for measuring the physical size of the sequential sections,
   (b) conveying means for transporting the elongated object past the measuring device whereby the sequential sections are aligned with the measuring device for measuring the physical size thereof, and
   (d) means for supporting the sequential sections in response to the measured physical size whereby the sequential sections of the elongated object are relieved of their own weight and are free to assume a position corresponding to their natural contour during measuring.

2. The installation of claim 1, wherein the conveying means comprises a drive for advancing the elongated object in a direction of elongation of the object, and the supporting means comprises two grippers spaced in said direction and coupled to the advancing drive and a lifting drive associated with the grippers for exerting a lifting force on the gripped sections of the object corresponding to the measured physical size, and switching means for simultaneously actuating the lifting drive and the measuring device.

3. The installation of claim 1, wherein the supporting means comprises a water bath carrying the elongated object buoyantly.

4. The installation of claim 3, further comprises a trough having lateral walls containing the water bath, the lateral walls having transparent windows in the range of the measuring device.

5. The installation of claim 3, wherein the conveying means comprises means for creating a current in the water bath extending in a direction of elongation of the object for advancing the object in said direction.

6. The installation of claim 3, wherein the measuring device comprises electromechanical transducers arranged along the circumference of the elongated object, the transducers having sensing arms carrying anti-friction elements for contacting the circumference.

7. The installation of claim 3, further comprising a device for separating floating bodies from the water bath.

* * * * *